(No Model.)
H. KLINE.
Shaft-Coupling.
No. 227,980. Patented May 25, 1880.
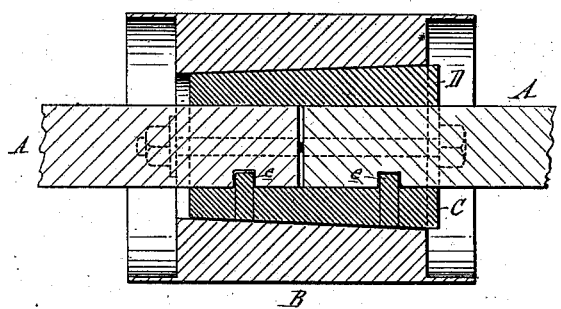
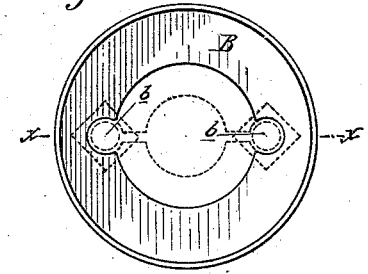
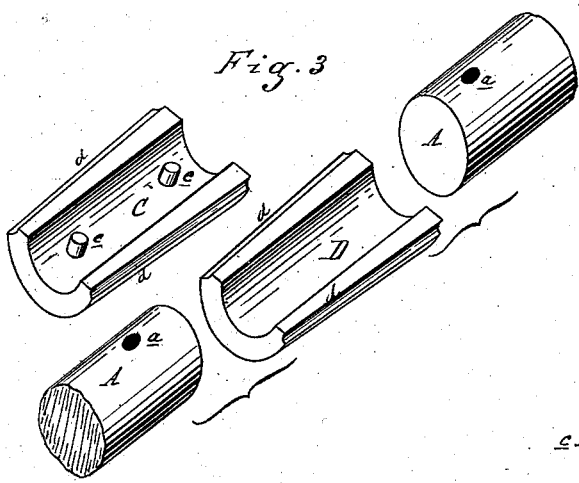
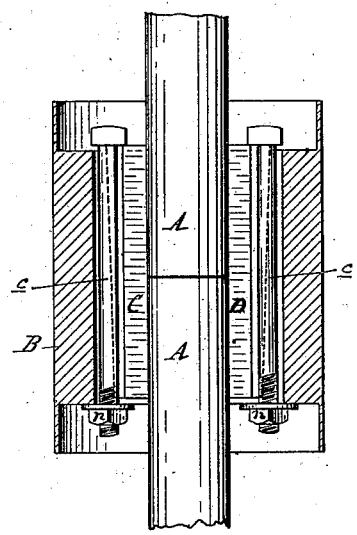
Attest:
A. Barthel
Charles J. Hunt
Inventor:
H. Kline
By Atty
Thos. S. Sprague

UNITED STATES PATENT OFFICE.

HENRY KLINE, OF JACKSON, MICHIGAN, ASSIGNOR TO E. DENNIS & CO., OF SAME PLACE.

SHAFT-COUPLING.

SPECIFICATION forming part of Letters Patent No. 227,980, dated May 25, 1880.

Application filed March 12, 1880. (No model.)

*To all whom it may concern:*

Be it known that I, HENRY KLINE, of Jackson, Jackson county, Michigan, have invented an Improvement in Shaft-Couplings, of which the following is a specification.

The nature of this invention relates to certain new and useful improvements in devices for coupling together the abutting ends of sections of line-shafting; and the invention consists in the construction and arrangement of parts whereby the coupling together of sections of shafting is effected with a less number of parts than in devices for a similar purpose now in use, wherein conical-shaped circular wedges are employed.

In the drawings, Figure 1 is a vertical central section of my device coupling two sections of line-shafting together. Fig. 2 is an end elevation of the inclosing-case. Fig. 3 is a perspective of the two parts which form the hollow and externally conically-shaped clamp, and also two sections of shafting. Fig. 4 is a horizontal section on line *x x*, Fig. 2.

In the accompanying drawings, which form a part of this specification, A A represent two sections of shafting which it is desired to couple together in line. Near the abutting ends of these sections are the holes *a*.

B is a hollow case, the opening through which is conical—that is to say, larger at one end than the other and gradually tapering. It is also provided with two channels, *b*, opposite each other, and each opening into the central bore, to receive the bolts *c*, which hold the parts together, the heads and nuts of said bolts being concealed within the overhanging flanges at each end of the case.

C is one half of a tube or clamp, the bore of which conforms to the circumference of the shaft. This part C is provided with two internally-projecting studs, *e*, which are designed to engage and enter the holes *a* in the sections of the shaft.

D represents the other half of the clamp, which is of the same construction as the part C, except that it is not provided with the studs. These two parts, being conical in form when put together, form a circular wedge, their edges being cut away slightly, as shown at *d*, to partially embrace the bolts. These parts C D being in place on the shaft, the case B is slipped over them, and the bolts inserted and drawn to place by proper nuts *n*, when the shaft will be found rigidly coupled.

It will be observed (see Fig. 4) that the heads of the bolts *c* when inserted in place bear only on the upper ends of the two-part cones C D, and that the nuts *n* on the lower ends of said bolts bear against the lower end of the tapering case B, thus securely holding the parts together when the bolts *c* are inserted and the nuts *n* screwed up.

I am aware that couplings of this character have been employed and patented wherein two clamps of a conical form have been employed; but such clamps are not made in two parts, but each forms a conical-shaped ring, requiring a double-conical case, to enable them to fulfill their proper functions. I therefore do not broadly claim securing abutting-ends of shafting together.

I am also aware that a two-part double-inclined cone has heretofore been employed in coupling shafts, and that a sleeve with a single tapering chamber, having two separate tapering elastic bushes, one of which is drawn outward by a nut and the other forced inward by another nut, has been employed in coupling shafts, and I therefore lay no claim to these inventions.

What I do claim as my invention is—

In a shaft-coupling, the combination, with the case B, provided with a single central conical opening and channels *b*, of the cone-shaped half-tube C, having studs *e*, cone-shaped half-tube D, bolts *c*, having their heads bearing against the half-tubes C D, nuts *n*, bearing against one end of the case B, and shaft A, having holes *a*, substantially as described, and for the purpose set forth.

HENRY KLINE.

Witnesses:
W. C. LEWIS,
L. O. BEEBEE.